United States Patent [19]

Mathauser

[11] 4,391,353
[45] Jul. 5, 1983

[54] HAND OPERATED HYDRAULIC BICYCLE BRAKE

[76] Inventor: William R. Mathauser, 3000 "B" Ave., Anacortes, Wash. 98221

[21] Appl. No.: 227,925

[22] Filed: Jan. 23, 1981

[51] Int. Cl.³ .......................... B62L 1/10; B62L 3/02
[52] U.S. Cl. .............................. 188/24.12; 188/24.19; 188/24.22; 188/344
[58] Field of Search .............. 188/24.11, 24.12, 24.15, 188/24.16, 24.22, 72.4, 72.5, 72.6, 344, 345, 24.14, 24.19; 60/571, 593; 92/98 D

[56] References Cited

U.S. PATENT DOCUMENTS

| | | | |
|---|---|---|---|
| 2,178,490 | 10/1939 | Nielsen | 92/98 D |
| 2,896,412 | 7/1959 | Becker et al. | 92/98 D |
| 2,977,762 | 4/1961 | Dilworth | 92/98 D |
| 3,526,171 | 9/1970 | Barnes | 92/98 D |
| 3,762,280 | 10/1973 | Kreuter et al. | 92/98 D |
| 3,776,333 | 12/1973 | Mathauser | 188/344 |
| 3,921,764 | 11/1975 | Mathauser | 188/24.14 |
| 3,995,723 | 12/1976 | Holcomb, Jr. | 188/72.4 |
| 4,055,235 | 10/1977 | Tanaka et al. | 188/24.14 |
| 4,235,265 | 11/1980 | Feliks | 92/98 D |

FOREIGN PATENT DOCUMENTS

| | | | |
|---|---|---|---|
| 875226 | 9/1942 | France | 188/344 |
| 52-077 | 4/1977 | Japan | 188/344 |

Primary Examiner—Douglas C. Butler
Assistant Examiner—R. R. Diefendorf
Attorney, Agent, or Firm—Shoemaker and Mattare, Ltd.

[57] ABSTRACT

A hand operated hydraulic bicycle brake includes a brake pad holding unit located in back of the front fork of a bicycle. A flexible fluid line couples a master cylinder located on the handlebars of the bicycle to a slave cylinder located adjacent the rim of the front wheel of the bicycle. Actuation of the slave cylinder forces the brake pad into contact with the rim, and further actuation of the master cylinder causes the unit to pivot to bring a second brake pad into contact with the wheel rim.

17 Claims, 7 Drawing Figures

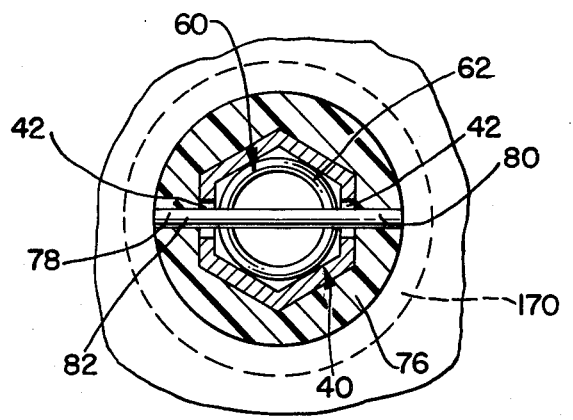
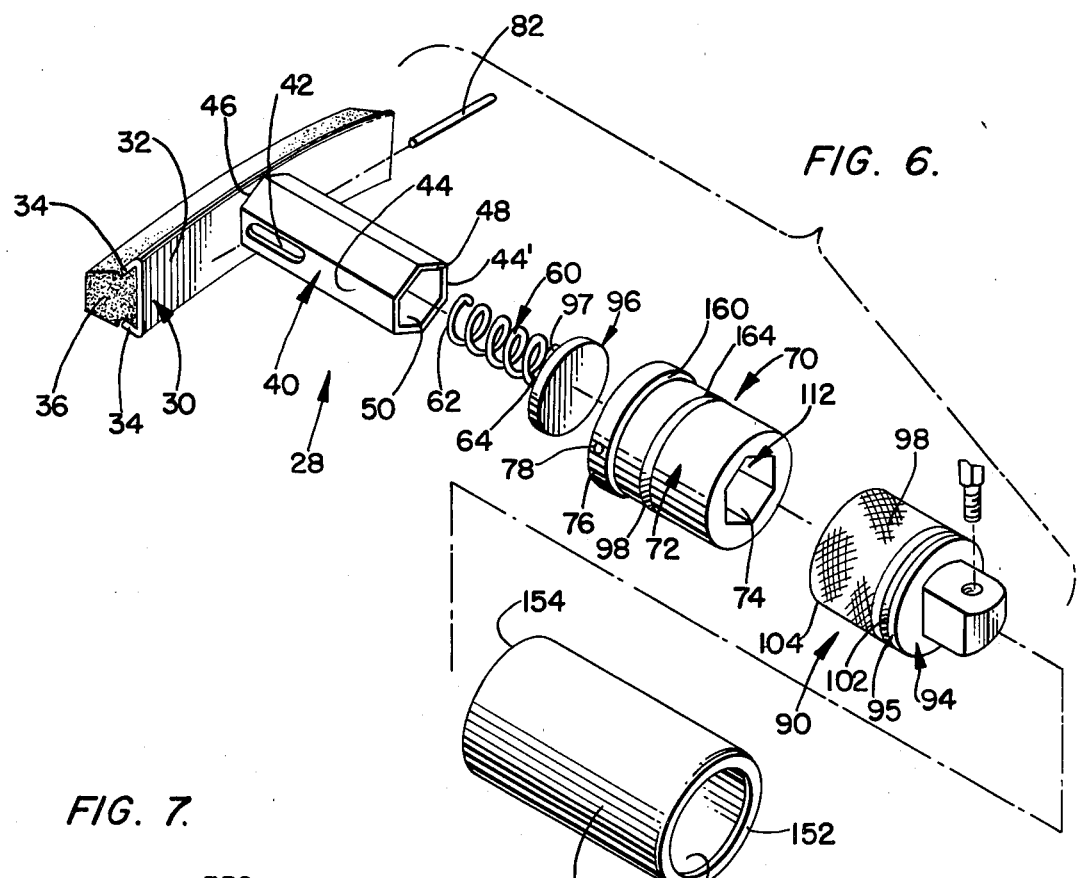
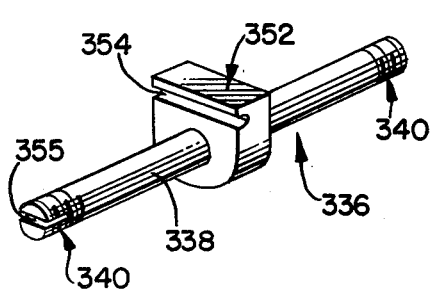

HAND OPERATED HYDRAULIC BICYCLE BRAKE

BACKGROUND OF THE INVENTION

The present invention relates in general to brakes for land vehicles, and, more particularly, to bicycle brakes.

There are several drawbacks inherent in those brakes presently used with bicycles. Among these drawbacks are the following.

If the brake is mounted on the front wheel, that brake is mounted in front of the bicycle front fork. This type of mounting generates chatter and is mechanically unsound because a bad bending moment is placed on the bolt attaching the brake to the bicycle frame. Such bending moment may eventually cause the bolt to crack or break. Such forward mounting also transfers no positive braking forces into the bicycle frame except via bolt bending. Furthermore, such forward mounting exposes the brake to dirt and the like, as well as exposes that brake to damage due to collision, or cargo being carried on the bicycle, or the like.

A further drawback inherent with presently available bicycle brakes results because the mounting bolt is the main point for mounting the brake. Thus, the distance between the mounting bolt at the fork or rear stay varies considerably with the wheel size, frame size, and the like, and the support bracket that holds the brake shoe has to be designed to carry considerable leverage forces. In many cases, the reach is considerable. At the extremities of the reach, when the brakes are applied, very bad twisting and consequent chatter of the brake shoes becomes apparent. All presently available brakes are designed to have a single supporting arm, and the brake pad and brake block support is mounted on one side of the support arm. This offset causes detrimental torsional forces. If the arms are designed and made strong enough and heavy enough to counteract most of these forces, these arms become unduly large and heavy. The wide range of frames as marketed, and wheel sizes, and rim angles makes it very difficult to accommodate these varied conditions with presently available bicycle brakes.

Most of the presently known hydraulic bicycle brakes utilize two cylinders. The use of two cylinders causes several problems. First, a considerable amount of weight is added by the presence of an extra cylinder. Two cylinders generally encumber the brake unit and make it vunerable to damage due to the far-reaching appendage of the unit. Such vulnerability merely doubles maintenance problems and initial costs involved with such units. Size and weight, both being major factors in bicycles, are important considerations detrimentally affected by the use of two cylinders. A large master cylinder is required to supply both of the slave cylinders, and thus the size and weight of such units is increased as compared to a unit using only a single slave cylinder.

It is noted that in reality, there are no hydraulic bicycle brakes available today on the market. The Shimano brake has a reservoir system similar to that in an automobile, and it occasionally, especially when the bike is roughly handled or tipped over, has air in the system. This happens quite often, and requires proper bleeding and servicing. In order to perform this service, a man had to be a hydraulic expert. This presents the problem of installing a sufficient number of repair stations to service the brake. Also, the brake has not shown good acceptance because of its very heavy and clumsy appearance.

Many presently known bicycle brake units include factory sealed systems. Such systems present still further drawbacks. For example, on brake units with factory sealed systems, no field or owner maintenance can be performed.

U.S. Pat. No. 3,776,333 discloses a brake with a sealed system. Where this device does not have the servicing problems that the Shimano had, it has other disadvantages. In actual service, it was found that a system that was indeed sealed had to be replaced in its entirety if any damage occurred within the system, such as a broken line, leak, or the like. Secondly, it was found that within the system, any flexible portion thereof, such as the flexible hydraulic line itself, has one inherent characteristic. Any flexible material that is carrying fluid under pressure constantly has a tendency to bleed and have permeability. In time, depending on pressure and temperature, the brakes lose their effectiveness and may become quite dangerous. There is no known way of coping with this condition. Also, this requires dealers to carry a series of different lengths of hydraulic lines to accommodate various sizes of bicycles. Another disadvantage of the device disclosed in this patent is the cost and limited life of the bellows. There is a definite limit of travel in the bellows, and if this is extended, overstressing of the bellows and an extremely short life will result.

One presently known brake unit is disclosed in U.S. Pat. No. 3,935,927. However, the device disclosed in this patent has several drawbacks. First, the system disclosed in this patent is virtually a fixed system in that it allows for no adjustment other than horizontal. The patented system is inherently very heavy, and therefore is not a practical brake for bicycles. It is here noted that, with the exception of heavy tandem-type machines where two, three or four people are riding on them, use of a disc-type brake is not possible. Such heavy machines use heavy wheels and heavy spokes to allow the forces from a disc mounted at the hub to be transferred to the outer periphery of the wheel. When a disc is mounted as just mentioned on a conventional bicycle, and an effort is made to stop the bicycle from the center of the wheel, such as in the patented disc brake, it subjects the nipples, the spokes and the rim to pressures and forces that these elements are not designed to withstand if the weight of the bicycle is to be kept within practical limits. It is here noted that the heaviest drag on a bicycle is that of the periphery of the wheel and the outer extremities of the wheel. Tires, rims, spokes, and the like should, therefore, be as light as possible. As braking forces are applied closer to the outer periphery of a wheel, these forces become more effective and less pressure is required. Thus, the forces necessary to stop a wheel in the center as disclosed in the just-referenced patent far exceed such forces as applied at the outer circumference of that same wheel. In order to induce such stopping forces in the patented device, a considerable amount of weight in material alone is required. In motorcycles, where weight is not an important criteria, the patented brake may be practical, as in nearly all cases, the brake is actuated by a rider's foot, and ample leverage and pressure can be generated. However, in a hand brake, since there is so little energy or forces which can be generated by a rider's hand, it is imperative that as little loss as possible occurs between the hand pressures and the pressures generated at the brake pad.

A further prior art brake system is known as the Shimano-type brake system. The Shimano system is a reservoir-type hydraulic system. This, on a bicycle, has proven to be undesirable. It uses a wet cylinder similar to that in a car, and, of course, a certain amount of dripping and bleeding is always prevalent. Secondly, with a so-called "open-system", any air entrapment in the system from the bicycle tipping over, or the like, causes difficult problems. The brake is no longer being manufactured because of this vulnerability to ingesting air into the system.

Furthermore, presently known bicycle braking devices are difficult and expensive to manufacture. Often it takes as much as 30 minutes line time to assemble such devices. This lengthy assembly time is caused because appendages or cables are positioned and welded on various positions of the frame. Other brackets and fittings are also painstakingly welded to the frame and the cable is carefully put through small eyelets and leads. The brake is finally installed in its proper position. The cables are then adjusted, tightened and cut, and the brake aligned and adjusted in its final form. There seems to be no quick way of executing the above steps.

Yet a further disadvantage to known brakes results because of the gripping requirements of hand operated hydraulic brakes. In all mechanical, cable brakes marketed and in use today, in order to get sufficient braking force and to compensate for friction within the system, the lever handle, or arm, must have within its design as much lever action as practical. Usually a 5 or 6 to 1 leverge ratio is all that can be designed into this type of system. The Campagnolo brake, for example, has a distance of 2½ inches between the handlebar and the back of the lever handle. If one has a large hand, and is capable of pulling the brake, one can get adequate stopping conditions. However, small-handed children and women do not have that reach or that power to properly stop the bicycle. This means in order to brake a bicycle, especially if it is loaded, the small-handed person must reach out and simply pull the handle itself. This is not a squeezing action and is very dangerous to do, but is simply the only way such a person can stop the bicycle. Squeezing between the thumb and forefinger is the only practical way of controlling the forces.

SUMMARY OF THE INVENTION

The hydraulic bicycle brake embodying the teachings of the present invention includes a brake pad unit mounted behind the front fork of a bicycle and which has a single slave cylinder fluidly connected to a hand actuated master cylinder by a flexible fluid line. Of course, a bicycle has a front and a rear brake, but only the front brake will be discussed here in the interest of brevity. The flexible line is releasably coupled to a hydraulic cylinder actuator which moves a brake pad holder.

A second brake pad holder is mounted on the brake pad unit to be immovable with respect to that unit. The second brake pad is mounted on the unit by an eyeball-shaped joint. Thus, the brake unit can be adjusted up or down with respect to the bicycle front wheel, toward or away from that front wheel, and each pad can be reoriented about 360° with respect to a longitudinal centerline of an arm supporting the pad holder.

The pads are oriented so that braking generated forces are taken directly in the outer of the two brake pad holder arms, thereby eliminating substantially all twisting of those arms.

Only one cylinder is used, and thus the drawbacks discussed above with regard to dual cylinder units are overcome. Furthermore, mounting of a unit behind the bicycle front fork overcomes the drawbacks discussed above with regard to the presently available units which are all mounted in front of such front fork. The flexibility of the hydraulic line used in the device disclosed herein permits such mounting position to be assumed by the unit; whereas cable systems will not permit such mounting.

The flexible hydraulic line is detachably connected to the brake pad holder unit so that the brake unit can be easily serviced in the field or by a bicycle shop.

A rolling diaphragm is used in the device disclosed herein. This rolling diaphragm has one end thereof which evaginates during the actuation step as opposed to an accordian-like folding and unfolding of a bellows. A bellows, be it metal or synthetic material, has a very short lifetime and a limited degree of travel as compared to the rolling diaphragm used herein. Furthermore, the rolling diaphragm is less expensive to manufacture than a bellows.

The device of the present invention includes a return spring located within a hexagonal arm which, as will be apparent from the ensuing description, is a piston arm. Such elements are easily manufactured and easily assembled in a secure fit. Manufacturing costs and time are therefore substantially reduced over presently available devices, while the overall device is superior to such available devices.

In the brake disclosed herein, there is only 2½ inches between the lever and the handle. Also because of the lack of friction in the system and the hydraulic advantage between the dissimilar sizes of the master cylinder and the slave cylinder, riders can even ride on "top" of the bars and can generate sufficient force to adequately stop the bicycle. Most people do indeed ride with the hands on top of the bars rather than down in the "drop" because it is far more comfortable than the so-called "racing" or on-the-drop position. The above-discussed disadvantages to small-handed people are thus overcome by the presently disclosed brake.

OBJECTS OF THE INVENTION

It is the main object of the present invention to mount a hand actuated hydraulic bicycle brake pad actuator unit behind a front fork of a bicycle.

It is another object of the present invention to provide an easily and efficiently manufactured hand actuated hydraulic brake for a bicycle.

It is still another object of the present invention to provide a hand actuated hydraulic bicycle brake which is easily serviced.

It is yet another object of the present invention to provide a hand actuated hydraulic bicycle brake which is easily oriented into a position for efficient braking.

It is a further object of the present invention to provide a hand actuated hydraulic bicycle brake having only one slave cylinder.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 5 is a view taken along line 5—5 of FIG. 4.

FIG. 6 is an exploded perspective of a brake pad holder actuating means used in the brake unit embodying the teachings of the present invention.

FIG. 7 is a perspective view of an attaching bolt used in the brake unit embodying the teachings of the present invention.

DETAILED DESCRIPTION OF THE INVENTION

Figure 1:
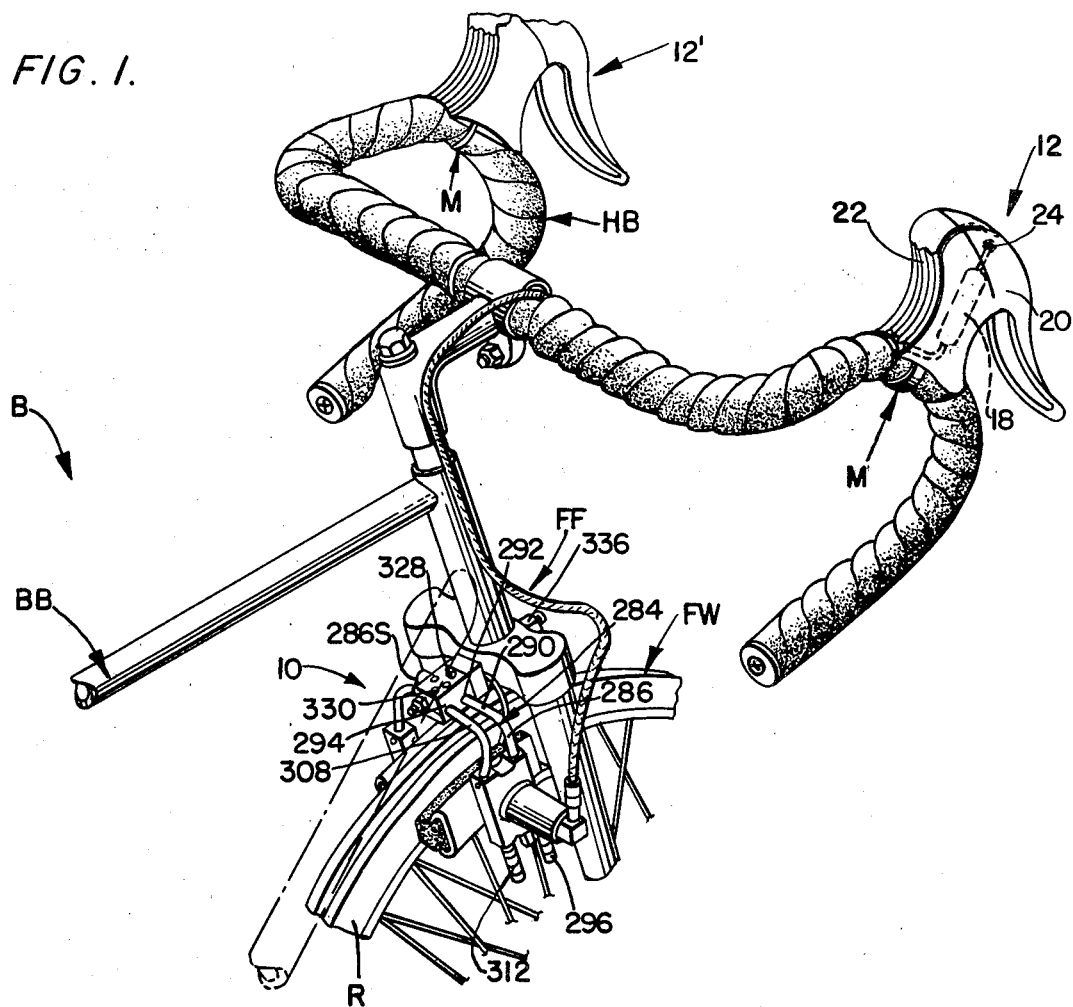
FIG. 1 is a perspective of a front of a bicycle having mounted thereon a brake unit embodying the teachings of the present invention.

Shown in FIG. 1 is a brake unit 10 embodying the teachings of the present invention. The unit 10 is mounted on a front wheel FW of a bicycle B, and includes a pair of hand actuators 12 and 12' mounted on the handlebars HB of the bicycle by suitable mounting means M, or the like. Actuator 12' operates a rear brake unit. As shown in FIG. 1, brake unit 10 is mounted behind the front fork FF of the bicycle and is located beneath backbone bar BB of the bicycle. It is here noted that the unit 10 can also be mounted behind a rear stay of the bicycle. However, in the interest of brevity, the front fork only will be discussed; no limitation is intended by such discussion, however. A flexible hydraulic line 16 is connected to the hand actuator 12. The flexibility of the line 16 permits the brake unit to be properly positioned.

The hand actuator 12 includes a master cylinder 18 and an actuating lever 20 pivotally mounted on a mounting bracket 22 by a pivot pin 24. The mounting bracket is mounted on the handlebars by mounting means M. Actuation of the lever 20 toward the handlebars forces hydraulic fluid from the master cylinder 18 into the brake unit 10 via the flexible hydraulic line 16. As will be discussed below, return movements of elements in the brake unit forces the hydraulic fluid back into the master cylinder via the hydraulic line 16.

The brake unit is best shown in FIG. 6, and attention is directed thereto. The brake unit includes a movable brake arm 28 which includes a brake pad holder 30 having a back 32 and inwardly inclined sides 34 which grasp a brake pad 36 therebetween. The brake pad holder 30 further includes a hollow, polygonal, preferably hexagonal, projection 40 having a pair of elongate slots, such as slot 42, defined in sides 44 and 44' thereof. The polygonal shape of the arm 40 prevents rotation thereof, as will be apparent from this disclosure. The projection is integral with the back and extends outwardly from root 46 thereof to outer rim 48 thereof. The projection has a bore 50 defined longitudinally thereof.

Figure 3:
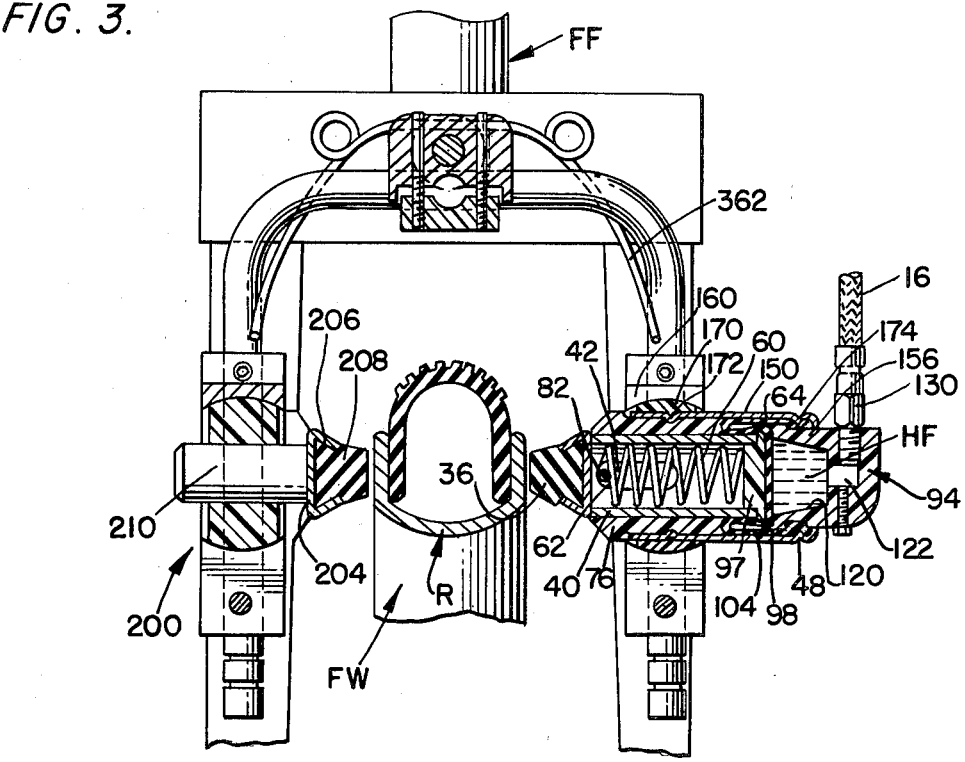
FIG. 3 is a side view taken along line 3—3 of FIG. 2.
Figure 4:
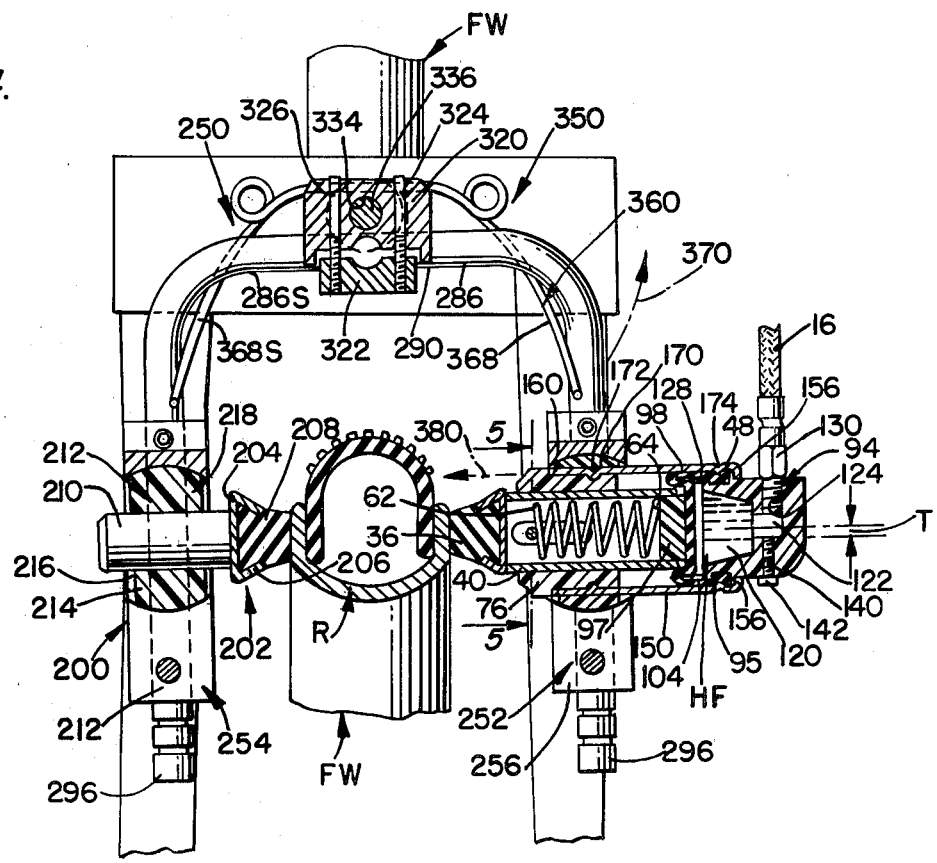
FIG. 4 is a view similar to FIG. 3 showing the brake unit in an actuated, braking orientation.

A helical return spring 60 is positioned in the bore 50 and has one end 62 located adjacent the slots 42 and another end 64 located adjacent the rim 48, as best shown in FIGS. 3 and 4.

A spring retainer unit 70 includes a cylindrical thimble 72 having a polygonal, preferably hexagonal, bore 74 defined longitudinally thereof and a collar 76 on one end thereof. The polygonal bore 74 receives polygonal projection 40 and is sized and shaped accordingly. A pair of pin holes 78 and 80 are defined on diametrically opposite locations on the collar, and accommodate a spring retainer pin 82 therein. The pin 82 fits through the pin holes and the slots 42 to extend across the bore 50 of the projection. The spring end 62 abuts this pin as best shown in FIGS. 3 and 4. The pin is snugly received in the pin holes A cylindrical actuating piston 90 includes a lug 94 having a groove 95 defined therein. A rolling diaphragm 98 is attached at end 102 thereof to the lug as shown in FIG. 3. End 102 of the diaphragm is captured in this groove. The rolling diaphragm is flexible and end 104 thereof evaginates in a braking movement, as will be discussed below.

An end cap 96 is secured to cylinder 44 to close that cylinder with the spring captured therein. A polygonal projection 97 is positioned on the end cap. There is a groove 98 defined in the thimble 70 for a purpose to be discussed below.

As best shown in FIGS. 3 and 4, the rim 48 abuts the diaphragm end 104. The projection 40 will move longitudinally through the bore 74 so that the brake arm 30 moves with respect to the thimble 72. The purpose of this movement will be evident from the ensuing discussion.

As best shown in FIGS. 3 and 4, the lug 94 has a fluid chamber 120 defined therein and a fluid passage 122 fluidly connecting a fluid fitting receiving bore 124 with the chamber 120. The fluid chamber 120 is in fluid communication with inner bore 128 of the rolling diaphragm 98. Hydraulic fluid HF is located in the chamber and in the rolling diaphragm. A fitting 130 fluidly detachably connects the hydraulic line 16 to the fluid passage 122 so fluid from the diaphragm and the chamber can move into and out of those chambers.

A drain 140 is fluidly connected to the passage 122 and includes a drain screw 142 to control the amount of hydraulic fluid in the system.

A tubular cover sleeve 150 has a crimped end 152 and a rim 154 and surrounds the afore-discussed elements as best shown in FIGS. 3 and 4. The crimped end 152 abuts a shoulder 156 in the base 92, and the rim 154 abuts shoulder 160 defined by the collar 76. The sleeve 150 is fixed to the thimble 72 on outer surface 164 of the thimble. A mounting gasket portion 170 surrounds the sleeve 150. Upon installation and assembly, a pair of grooves 172 and 174 are defined in the sleeve to be located for cooperation with groove 98 in the thimble and groove 95 in the lug as best shown in FIG. 3. The groove is rolled into the sleeve and indented into the thimble. The gasket or rolling eye ring 170 has a smooth inner surface which allows the cylinder 150 to be moved towards or away from the wheel, whichever is necessary, during the adjustment period. A protrusion in this gasket or ring would indent itself into the groove in the cylinder and would not allow this movement which, of course, is necessary. After retightening first frame 252, the entire unit is secured in its adjusted position. The sleeve 150 is forced into the thimble in the forward portion of the slave cylinder by crimping the two units together; on the opposite side of the slave cylinder this crimp or roll forces the diaphragm into the groove in the thimble, and locks and seals the unit into a sealed, leakproof chamber. There is no mounting gasket per se; the part 170 is simply part of the bellows and forms its own gasket as it is secured.

The brake unit further includes a stationary brake arm 200, best shown in FIGS. 3 and 4. It is noted that the brake arm 200 is not really stationary, as will be apparent from the ensuing discussion, but is stationary with respect to the mounting frame. Thus, the terms "fixed", "stationary", or the like, when used with respect to the arm 200, are intended to mean fixed with respect to the brake unit and not with respect to the bicycle wheel. The stationary arm 200 includes a brake pad holder 202 having a back 204 and inwardly inclined sides 205 which grasp a brake pad 208 therebetween. The brake pad holder 202 includes an anchor bolt 210 extending outwardly from the back 204. A mounting gasket 212 surrounds the bolt 210.

The gasket 212 has a spherical body 214, a planar outer face 216 and an inner section 218. The gasket thus is in the form of an eyeball socket and permits a great variation in adjustment of the brake arm 200, and hence in the overall brake unit 10. The brake arm 200 can be moved longitudinally in or out with respect to the arm 28, up and down, or rotationally about the bolt 210, thereby providing great adjustment versatility.

Both brake arms 28 and 200 are mounted on the front wheel FW by a mounting frame 250 which includes first frame 252 mounting the arm 28 and a second frame 254 mounting the arm 200. Both the first and second frames include housings, such as housing 256 shown in FIG. 2, which housings are bolted together by a fastener, such as bolt 258 shown in FIG. 2, to capture the brake arm in a bore, such as bore 260 shown in FIG. 2, via the mounting gaskets 170 and 212. The frames include bores 270 and 272 defined in legs 274 and 276, respectively, of each frame. Set screws 278 and 280 are mounted in the legs 274 and 276, respectively, to intersect the bores for a purpose which will be discussed below.

The mounting frame 250 further includes a U-shaped mounting bracket 284 having legs 286 and 286S thereof received through bores 272 of frame legs 276. A bight 290 of the bracket arm is received through a bore 292 of a clamp block 294.

Shear bolts 296 form the terminal ends of the bracket legs 286 and 286S and, as shown in FIGS. 1–4, extend beneath the housing legs 276. The shear bolts can be sheared off once the brake unit is properly positioned on the bicycle. The set screws 280 hold the bracket arms 286 in the bores 272 of the legs 276.

Figure 2:
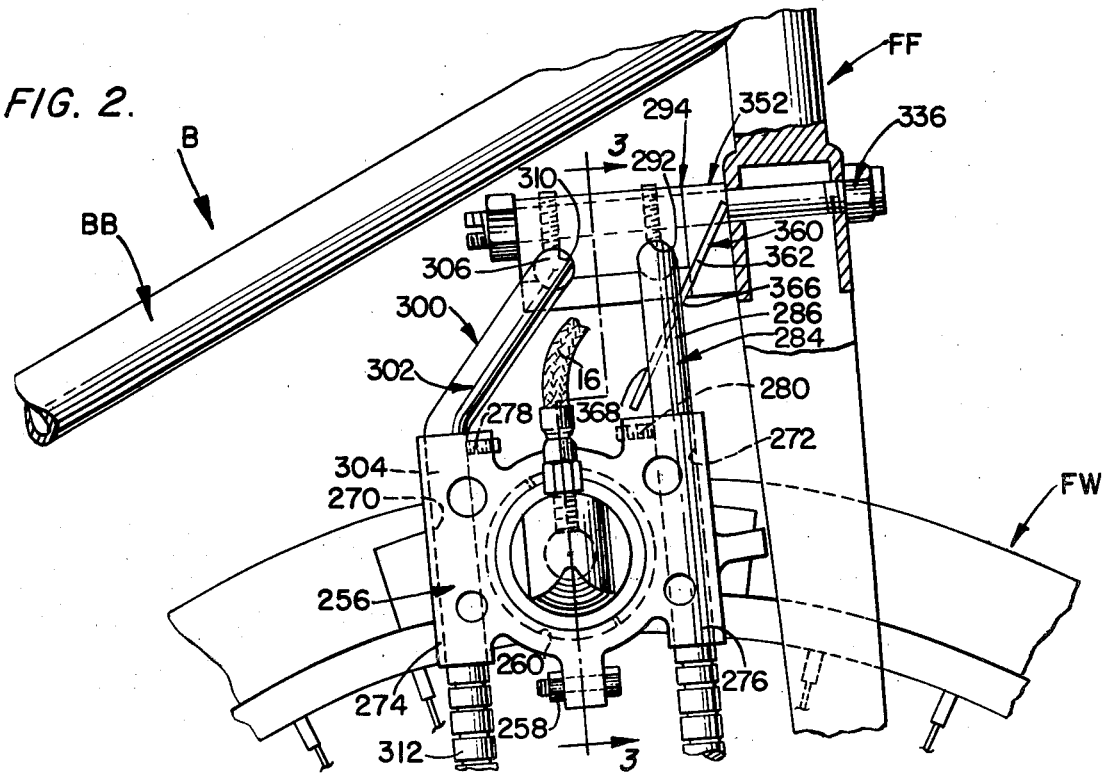
FIG. 2 is a side elevation of the brake unit embodying the teachings of the present invention.

As best shown in FIG. 2, the mounting frame further includes a second U-shaped bracket 300 which has angled legs 302 having lower sections 304 received through bores 270 of the frame legs 274. Each of the legs 302 includes an upper section 306 which is integral with a bight section 308 which is received through a bore 310 of the clamp block 294. Shear bolts 312 are located on the terminal ends of the leg lower sections 304, and set screws 278 retain the legs in bores 270.

The clamp block 294 includes a top portion 320 and a bottom portion 322 connected together by clamping bolts 324 and 326. The bores 292 and 310 are defined by channels defined in the top and bottom portions. Set screws 328 and 330 retain the bracket bight sections in the bores. A longitudinal bore 334 receives a main bolt 336 which attaches and mounts the clamp block 294 to the bicycle front fork FF as best shown in FIG. 2.

The main bolt 336 is shown in FIG. 7 to include a body 338 with threaded ends 340. A block 352 is mounted on the body 338 and has a groove 354 defined therein. A spring slot 355 is defined in one end of the bolt.

A brake unit orienting means 350 includes the mounting block 352 which is fixedly mounted on main bolt 336 between the clamp block 294 and the front fork FF. A U-shaped unit biasing spring 360 is fixedly mounted on main bolt 336 between the clamp block 294 and the front fork FF. A U-shaped unit biasing spring 360 is fixedly mounted on the block 352 by the groove 354 and includes legs 362 abutting the legs 368 and 368S of the bracket 284 as best shown in FIGS. 1–4. As the bolt is tightened onto the frame, the spring 360 is jammed between the frame and the base of the slot. By slightly loosening the jam nut 336, this unit can be slightly put to one side or the other with a wrench on the flat sides of the boss, which in turn puts a force on one side or the other of the spring and into the U-support. In this manner, perfect alignment of the entire unit with respect to the clearance of the two brake pads at the rim can be accomplished. The jam nut is tightened up and the unit will stay in perfect alignment. It is a very simple but most effective way of alignment. The spring 360 in this fashion serves two purposes. The clamp block pivots on the main bolt with respect to the mounting block. The operation and function of this biasing spring will be discussed below. The biasing spring contacts the arm 284 at points 366 and 368 and biases the legs 286 and 286S of the bracket 284 outwardly away from each other and upwardly toward the clamping block as indicated in FIG. 4 by the arrow 370.

The spring 360 supports the cylinder base and eyeball adjustment. This spring defines, without distortion or twist, the system limits. In other words, if the handle 20 is depressed far beyond normal, the yoke 250 uniformly allows a maximum amount of pressure against the brake shoe and then relieves accordingly. It does so without twisting or distorting. This yoke allows so-called "perfect stresses" to be transmitted from the brake shoe to the cylinder to the frame, and is lightweight and simple to manufacture and service.

A centering protrusion 400 is machined on housing 356 and rides against the front fork and has an angle to it so that the bracket remains centered on the housing. As the brake pads are driven forward during a braking action, the forces are directly transferred into this angled boss. The bracket riding against the front forks enables all forces to travel directly into the bicycle frame. When the force is applied, the angle on this small boss 400 forces the entire unit to align itself perfectly with the forks or rear stays.

By referring to FIGS. 3 and 4, the operation of the brake unit 10 can be seen. The FIG. 3 orientation of the brake arm represents the reposed orientation of the unit, and the FIG. 4 orientation of the arm represents the brake unit orientation of the unit.

From the above discussion it can be seen that sleeve 150 and base 92 are fixed with respect to arm 286 and thimble 72 is fixed with respect to the sleeve 150, and hence with respect to the arm 286. The actuator plate 102 and the projection 40 are fixed with respect to each other, but movable longitudinally of the projection 40 with respect to the sleeve 150 and hence with respect to the arm 286. The projection is slidably received in the bore 74 of the thimble to permit the just-discussed relative movement of the brake pad holder 30 with respect to the arm 286 of the mounting means 250.

The assembly procedure of the slave cylinder will now be described for further clarification. The retainer clip 30 that holds the rubber brake shoe 36 is welded to the hexagon piston rod 40. The spring 60 is inserted in the piston rod, the bearing 70 is slipped over the rod, and the piston head or cap 96 is secured to the other end, forming a complete assembly. At the other end of the cylinder is the lug that forms the cylinder head and contains the hydraulic line. The groove 95 in this head accommodates end 102 of the rolling diaphragm. The cylinder sleeve 150 is slipped over this portion and grooves 172 and 174 in the cylinder cooperate with the thimble, pinching and sealing the diaphragm into an internal unit with the cylinder head. The front piston assembly is then inserted into the cylinder and also rolled to complete the unit. The piston assembly and the diaphragm portion of the cylinder are in no way attached, but merely come in contact when being activated.

Upon actuation of the hand actuator 12, hydraulic fluid is forced from master cylinder 18 into the actuator, or slave, 90 via the fluid path which includes flexible tube 16, fitting 130 and channel 122. The rolling diaphragm expands from the FIG. 3 position into the FIG. 4 position under the influence of the incoming hydraulic fluid.

The expansion of this diaphragm forces the closure plate 102 and the hexagonal projection 97 toward the bicycle wheel as indicated by arrow 380 in FIG. 4. The brake pad 36 ultimately contacts wheel rim R, and, as the wheel and brake arm are fixed, will stop any further inward movement of the brake pad 34.

The brake arm 200 is stationary with respect to bracket arm 286S, and in order to complete the braking action, as more hydraulic fluid is forced into the rolling diaphragm, the entire unit must pivot around the wheels and about an axis which is essentially perpendicular to the axis of rotation of that wheel. A further influx of hydraulic fluid into the rolling diaphragm after the brake pad 36 contacts the rim of the wheel can only be compensated for by the afore-mentioned pivoting action of the brake unit. The brake unit 10 pivots in the direction of arrow 370 about the main bolt 336 to define a tilt indicated in FIG. 4 by reference indicator T. The tilting of the unit 10 forces the bracket arm 286S inwardly toward the wheel, and hence inwardly toward the brake arm 28.

Ultimately, after a predetermined amount of pivoting action by the brake unit has occurred, the brake pad 208 is forced against the wheel rim R thereby capturing that wheel rim in a braking action between the two brake pads 36 and 208 and further actuation of the master cylinder completes the braking movement.

By comparing FIG. 3 with FIG. 4, the action of the return spring 60 can be seen. The pin 82 is fixed with respect to the bracket arm 286 by engagement of the thimble 72 with the sleeve 150, the gasket 160 and the housing frame 252. Movement of the actuating cylinder 90 results in movement of the projection 40 which moves axially through the fixed thimble 72. Thus, the slots 42 in projection 40 are moved with respect to the pin 82 so that in the FIG. 3 reposed position, the pin 82 abuts ends 390 of the slots 42, and in the FIG. 4 braking position, the ends 390 of the slots are spaced from the pin 82. The braking movement of the actuator has thus compressed the return spring 60 which thereby places a return bias on the actuator which opposes the braking bias placed on that actuator by the hydraulic fluid being forced into chamber 128 via the master cylinder through movement of the hand actuator 12.

Release of the hand actuator releases that pressure on a hydraulic fluid which tends to force the actuator 90 toward the FIG. 4 position. As above-discussed, the return spring 60 is compressed during a braking action of the unit; thus, release of the hand actuator 12 releases the braking bias on the hydraulic fluid, and hence on the actuator 90, thereby allowing the return spring to force the actuator outwardly away from the bicycle wheel. The actuator draws the brake pad 36 away from the bicycle wheel.

Release of the brake pad 36 from the bicycle wheel permits the biasing spring 360 to force the brake arm 200 away from the wheel by twisting the unit 10 about the main bolt 336 in a direction opposite arrow 370.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A hand actuated hydraulic brake for a bicycle comprising:
    a hand actuated master cylinder mounted on the handlebars of a bicycle;
    a flexible fluid line connected to said master cylinder; and
    a brake pad holder unit mounted on the bicycle, said brake pad holder unit including a mounting fastener connected to such bicycle, a mounting clamp pivotably mounted on said mounting fastener, a bracket arm on said mounting clamp, first and second bicycle brake housings mounted on said bracket arm to be on opposite sides of a bicycle front wheel, said housings each being of a size commonly found on a bicycle, a lug mounted on said first housing, a fluid actuated brake arm moving means mounted on said first housing and a first brake pad mounted on said second housing, said brake arm moving means including a rolling diaphragm fluidly connected to said master cylinder by said flexible fluid line via said lug to exchange hydraulic fluid therewith, a movable brake pad holder having a projecting arm thereon, said arm being slidably mounted on said first housing and engaged against said rolling diaphragm for movement therewith, said rolling diaphragm including a closed bottom portion contacting said brake pad holder arm, a side portion adjacent to said first housing and a connecting portion connecting said diaphragm bottom and side portions so that said rolling diaphragm can fold upon itself within said bicycle brake housing and a lip on an end of said side portion remote from said bottom, said lip being captured between said first housing and said lug, said sufficient flexibility to operate efficiently in a bicycle hydraulic brake unit, an arm return means engaged against said rolling diaphragm to bias said diaphragm against action of hydraulic fluid forced thereinto by said master cylinder, and a second brake pad mounted on said movable brake pad holder.

2. The hand actuated hydraulic bicycle brake defined in claim 1 further including coupling means detachably coupling said flexible fluid line to said brake arm moving means.

3. The hand actuated hydraulic bicycle brake defined in claim 2 wherein said projecting hollow arm is a piston rod arm and is polygonal in peripheral shape.

4. The hand actuated hydraulic bicycle brake defined in claim 3 wherein said arm return means includes a compression spring mounted within said projecting hollow arm.

5. The hand actuated hydraulic bicycle brake defined in claim 4 wherein said arm return means further includes a thimble having a hexagonal bore defined longitudinally thereof and slidably receiving said projecting hollow arm therethrough and an abutting means against which said arm return means is abutted.

6. The hand actuated hydraulic bicycle brake defined in claim 1 wherein said brake unit is mounted behind the front fork of the bicycle.

7. The hand actuated hydraulic brake defined in claim 6 further including an alignment boss on said brake pad holder unit and abutting the front fork to maintain the holder unit properly oriented with respect to the front fork.

8. The hand actuated hydraulic bicycle brake defined in claim 1 wherein said holder unit return means includes a U-shaped spring.

9. The hand actuated hydraulic bicycle brake defined in claim 1 further including adjustable mounting means mounting said first brake pad on said second housing, said adjustable mounting means including a backing member having a fastener projecting therefrom and an eyeball shaped mount mounting said fastener to said second housing.

10. The hand actuated hydraulic bicycle brake defined in claim 1 further including fastener bolts attaching said first and second housings to said bracket arm.

11. The hand actuated hydraulic bicycle brake defined in claim 10 further including a second bracket arm attaching said first and second housings to said mounting clamp.

12. The hand actuated hydraulic bicycle brake defined in claim 11 further including a thimble and tubular sleeve surrounding said thimble.

13. The hand actuated hydraulic bicycle brake defined in claim 11 further including bleed means fluidly connected to said flexible fluid line.

14. The hand actuated hydraulic bicycle brake defined in claim 13 further including set screws attaching said bracket arm to said first and second housings.

15. The hand actuated hydraulic brake defined in claim 1 further including a pair of brake pad holder arms oriented so that a pad mounted on one of such arms has braking generated forces applied directly thereto.

16. A hand actuated hydraulic brake for a bicycle comprising:
a hand actuated master cylinder mounted on the handlebars of a bicycle;
a flexible fluid line connected to said master cylinder;
a brake pad holder unit mounted on the bicycle, said brake pad holder unit including a mounting fastener connected to such bicycle, a mounting clamp pivotably mounted on said mounting fastener, a bracket arm on said mounting clamp, first and second housings mounted on said bracket arm to be on opposite sides of a bicycle front wheel, a fluid actuated brake arm moving means mounted on said first housing and a first brake pad affixedly mounted on said second housing, said brake arm moving means including a rolling diaphragm fluidly connected to said master cylinder by said flexible fluid line to exchange hydraulic fluid therewith, a movable brake pad holder having a projecting hollow arm thereon, said hollow arm being slidably mounted on said first housing and engaged against said rolling diaphragm for movement therewith, said rolling diaphragm including a generally arcuate bottom portion having an outer diameter and contacting said brake pad holder arm, a generally cylindrical side portion adjacent to said first housing and a hoop portion connecting said diaphragm bottom and side portions, said side portion having an inner diameter essentially equal to the outer diameter of said bottom portion so that said bottom portion is in sliding contact with said side portion and said rolling diaphragm operates efficiently in a bicycle hydraulic brake unit, an arm return means engaged against said rolling diaphragm to bias said diaphragm against action of hydraulic fluid forced thereinto by said master cylinder, said arm return means including a thimble mounted on said first housing, an elongate slot defined in said brake pad holder projecting hollow arm, a pin fixed to said thimble and extending through said slot, and a spring abutting said pin and said brake arm and biasing said brake arm inwardly of said first housing, and a second brake pad mounted on said movable brake pad holder; and
a holder unit return means mounted on said fastener and engaged against said bracket arm to bias said brake pad holder unit into an upright orientation.

17. A hand actuated hydraulic brake for a bicycle comprising:
a hand actuated master cylinder mounted on the handlebars of a bicycle;
a flexible fluid line connected to said master cylinder;
a brake pad holder unit mounted on the bicycle, said brake pad holder unit including a mounting fastener connected to such bicycle, a mounting clamp pivotably mounted on said mounting fastener, a bracket arm on said mounting clamp, first and second housings mounted on said bracket arm to be on opposite sides of a bicycle front wheel, a fluid actuated brake arm moving means mounted on said first housing and a first brake pad affixedly mounted on said second housing, said brake arm moving means including a rolling diaphragm fluidly connected to said master cylinder by said flexible fluid line to exchange hydraulic fluid therewith, a movable brake pad holder having a projecting hollow arm thereon, said hollow arm being slidably mounted on said first housing and engaged against said rolling diaphragm for movement therewith, an arm return means engaged against said rolling diaphragm to bias said diaphragm against action of hydraulic fluid forced thereinto by said master cylinder, said arm return means including a thimble mounted on said first housing, an elongate slot defined in said brake pad holder projecting hollow arm, a pin fixed to said thimble and extending through said slot, and a spring abutting said pin and said brake arm and biasing said brake arm inwardly of said first housing, and a second brake pad mounted on said movable brake pad holder; and
a holder unit return means mounted on said fastener and engaged against said bracket arm to bias said brake pad holder unit into an upright orientation.

* * * * *